United States Patent [19]

Rai

[11] Patent Number: 4,807,402

[45] Date of Patent: Feb. 28, 1989

[54] DIAMOND AND CUBIC BORON NITRIDE

[75] Inventor: Ghanshyam Rai, Worthington, Ohio

[73] Assignee: General Electric Company, Worthington, Ohio

[21] Appl. No.: 156,272

[22] Filed: Feb. 12, 1988

[51] Int. Cl.[4] .............................................. B24D 3/00
[52] U.S. Cl. ....................................... 51/293; 51/295; 51/308; 51/309
[58] Field of Search ................... 51/293, 295, 308, 309

[56] References Cited

U.S. PATENT DOCUMENTS

| | | | |
|---|---|---|---|
| Re. 32,380 | 3/1987 | Wentrof, Jr. et al. | 407/119 |
| 3,743,489 | 7/1973 | Wentorf et al. | 51/307 |
| 3,767,371 | 10/1973 | Wentrof, Jr. et al. | 51/307 |
| 4,224,380 | 9/1980 | Bovenkerk et al. | 428/545 |
| 4,229,186 | 10/1980 | Wilson | 51/297 |
| 4,255,165 | 3/1981 | Dennis et al. | 51/309 |
| 4,311,490 | 1/1982 | Bovenkerk et al. | 51/307 |
| 4,440,573 | 4/1984 | Ishizuka | 75/243 |
| 4,525,179 | 6/1985 | Gigl | 51/309 |

Primary Examiner—Paul Lieberman
Assistant Examiner—Willie J. Thompson
Attorney, Agent, or Firm—Gary L. Loser

[57] ABSTRACT

Abrasive compacts are described which comprise a support mass having abrasive masses bonded to each of the upper and lower surfaces of said support mass. Preferably, the abrasive masses are diamond or cubic boron nitride and the support mass is a sintered carbide. Bonding of the abrasive masses to the support mass preferably is accomplished by a high pressure, high temperature process.

23 Claims, 1 Drawing Sheet

DIAMOND AND CUBIC BORON NITRIDE

BACKGROUND OF THE INVENTION

The present invention generally relates to abrasive bodies and more particularly to diamond and cubic boron nitride abrasive compacts or inserts.

Abrasive compacts are well known in the art and consist essentially of a mass of abrasive particles present in an amount of at least 70 percent by volume bonded to a hard substrate. The abrasive particles of compacts are invariably superabrasives, such as diamond and cubic boron nitride, and the hard substrate is usually a carbide such as tungsten carbide, titanium carbide, tantalum carbide or a mixture thereof. Abrasive compacts, particularly diamond and cubic boron nitride compacts, may be self-bonded, i.e., the individual particles of the compact are fused and bonded together without the aid of a metal or like bonding matrix. Alternatively, compacts may be produced where there is a suitable bonding or cementing matrix present.

Diamond and cubic boron nitride compacts can be used for the machining of metals. In use, the compacts are fastened to a suitable tool support such as a shank to form a tool. The compacts may be fastened to a backing such as a cemented carbide backing and then the backing fastened to the support to form the tool.

U.S. Pat. No. Re. 32,380, assigned to the same assignee as the present invention, describes a diamond compact comprising (a) a diamond crystalline mass wherein the concentration of diamond is in excess of 70 percent by volume and in which the diamond crystals are disposed in random fashion and substantially all of the diamond crystals are directly bonded to adjacent diamond crystals and (b) a support material which is a cemented carbide mass considerably larger in volume than the volume of the diamond crystalline mass, the diamond crystalline mass and the cemented carbide mass being joined at an interface consisting of cemented carbide, or its elements and diamond crystals.

U.S. Pat. No. 3,767,371, assigned to the same assignee as the present invention, describes an analagous cubic boron nitride compact comprising (a) a unified mass of greater than 70 volume percent cubic boron nitride crystals bonded to (b) a supporting mass of metal bonded carbide selected from the group consisting of tungsten carbide, titanium carbide, tantalum carbide and mixtures thereof; the bonding material being selected from cobalt, nickel, iron and mixtures thereof and the interface between the mass of cubic boron nitride crystals and metal bonded carbide support being free of voids. U.S. Pat. No. 3,743,489, also assigned to the same assignee as the present invention, teaches that further including aluminum with the bonding medium results in superior bonding of the cubic boron nitride crystals to each other as well as between the cubic boron nitride mass and the carbide substrate.

U.S. Pat. No. 4,224,380, assigned to the same assignee as the present invention, describes thermally stable diamond and cubic boron nitride compacts wherein the bonding material, for example cobalt or cobalt alloys, is removed so as to provide compacts having substantially 100% abrasive particles and which therefore can withstand exposure to temperatures of 1200° C. to 1300° C. without substantial thermal degradation. The compacts can be made only of self-bonded abrasive particles or they can be made of self-bonded particles bonded to a substrate such as cemented carbide.

U.S. Pat. No. 4,229,186 discloses a laminated abrasive body which is in effect a thick compact comprising a plurality of diamond or cubic boron nitride compacts laminated together by means of a metal or metal alloy braze. Such laminated abrasive bodies are said to be useful as a high pressure piston in an apparatus for obtaining ultra-high pressures on the order of megabars.

All of the foregoing patents are incorporated by reference into the present disclosure.

Although supported and unsupported superabrasive compacts have been found to be of great value in the metal-machining field, they all suffer from the disadvantage that once the superabrasive mass is worn or damaged, the compact must be disposed of and a new compact inserted in its place. Furthermore, unsupported superabrasive compacts have lower toughness and tend to form cracks under repeated bend loading conditions encountered in high speed machining operations. The cracks so initiated in the body of the insert propagate easily due to lower toughness of the insert and cause it to break into many pieces. It has now been discovered that these disadvantages can be minimized by employing compacts having superabrasive masses bonded to each of the upper and lower surfaces of a support mass. Thus, when one superabrasive mass is damaged, for example, by cracking or chipping, the compact is simply turned over and the other superabrasive mass used to combine the machining operation. Moreover, any such crack cannot reach the other side of the insert due to the presence of the tough support mass between the superabrasive layers.

SUMMARY OF THE INVENTION

It is an object of the present invention to provide abrasive compacts, especially diamond and cubic boron nitride compacts, having abrasive mases bonded to each of the upper and lower surfaces to a support mass, such as a cemented carbide.

It is another object of the present invention to provide a method for making abrasive compacts having abrasive masses bonded to each of the upper and lower surfaces of a support mass.

In accordance with one aspect of the present invention, there is provided a compact comprising a support mass having abrasive masses bonded to each of the upper and lower surfaces of said support mass. The abrasive masses preferably are selected from diamond and cubic boron nitride and the support mass preferably is a sintered carbide. The abrasive masses preferably are directly bonded to the support mass, however, it is contemplated that indirect bonding, brazing for example, may also be employed in the practice of the invention.

In accordance with another aspect of the present invention, there is provided a method for making the compacts of the present invention which comprises:

(a) placing within an enclosure a quantity of abrasive particles and a quantity of support material in a manner such that abrasive particles will become bonded to the upper and lower surfaces of said support material;

(b) simultaneously heating and applying pressure to said enclosure in an amount effective to form a unified mass;

(c) ceasing the input of heat to said enclosure;

(d) ceasing the application of pressure to said enclosure; and (e) recovering the unified mass produced.

DESCRIPTION OF THE INVENTION

Figure 1:
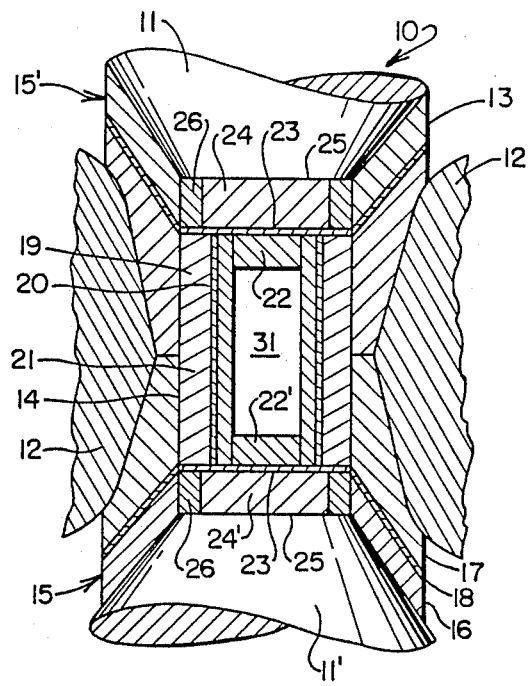
FIG. 1 illustrates an exemplary high pressure, high temperature apparatus useful in the preparation of the product of this invention.

One type of apparatus which can be used to make the preferred abrasive compacts of the present invention is the high pressure, high temperature apparatus described in U.S. Pat. No. 2,941,248, incorporated herein by reference and illustrated in FIG. 1. Apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasketing/insulating assemblies 15 and 15', each comprising a pair of thermally insulating and electrically non-conducting pryophyllite members 16 and 17, and an intermediate metallic gasket 18.

Reaction vessel 14 in one preferred form includes a hollow salt cylinder 19. Cylinder 19 may be of other material, such as talc, which is not converted during high pressure, high temperature operation to a stronger, stiffer state and is substantially free of volume discontinuities occurring under the application of high pressures and temperatures. Materials meeting the criteria set forth in U.S. Pat. No. 3,030,662, incorporated herein by reference, are useful for preparing cylinder 19.

Positioned concentrically within and adjacent to cylinder 19 is a graphite electrical resistance heater tube 20. Within graphite heater tube 20 there is in turn concentrically positioned the cylindrical salt liner 21. The ends of liner 21 are fitted with salt plugs 22 and 22', disposed at the top and bottom, respectively. As will be described hereinbelow, liner 21 may have a cylindrical hollow core to receive one large charge assembly containing sub-assemblies or the liner may consist of a series of mold assemblies arranged in a stack for the preparation of a plurality of composite tool inserts or compacts.

Electrically conductive metal end discs 23 and 23' are utilized at each end of cylinder 19 to provide electrical connection to graphite heater tube 20. Adjacent each disc 23 and 23' is an end cap assembly 24 and 24', each of which comprises a phyrophyllite plug or disc 25 surrounded by an electrical conducting ring 26.

Operational techniques for simultaneously applying both high pressures and high temperatures in this apparatus are well known to those skilled in the art. The foregoing description relates to only one high pressure, high temperature apparatus which can be used for practicing the present invention. Various other apparatuses are capable of providing the required pressures and temperatures that may be employed within the scope of this invention.

Figure 2:
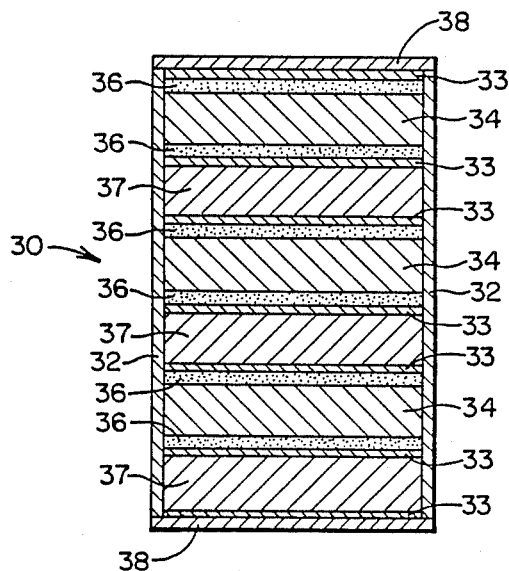
FIG. 2 illustrates in section one a form of charge assembly configuration for use within the apparatus of FIG. 1 in the practice of the instant invention.

FIG. 2 illustrates a charge assembly arrangement for producing a plurality of disc or pill-shaped composites—i.e., sintered carbide masses with a layer of abrasive, preferably diamond or cubic boron nitride, over each of the upper and lower surfaces of said sintered carbide masses. Charge assembly 30, although not illustrated in proportion, fits within space 31 of the apparatus of FIG. 1.

Charge assembly 30 consists of a cylindrical sleeve 32 of shield metal, preferably selected from the group consisting of zirconium, titanium, tantalum, tungsten and molybdenum. Within cylindrical shield metal sleeve 32 are disposed a number of sub-assemblies protected above and below by shielding discs 33, preferably made of titanium or zirconium, and having pyrophyllite plugs 38 and 38' at the ends of said sleeve 32. Each sub-assembly so protected on all sides consists of a support mass 34 and an abrasive mass 36 disposed above and below said support mass 34. Each mass 34 can be made of a suitable support material which preferably is a carbide molding powder. Tungsten carbide, titanium carbide, tantalum carbide, and molybdenum carbide or a mixture thereof is most desirable, with tungsten carbide, plus cobalt powder being especially preferred. Each abrasive mass 36 can be any suitable abrasive material, however, diamond and cubic boron nitride are particularly preferred in the practice of the present invention.

Instead of arranging masses 34 and 36 with a sharp transition from the carbide powder mix to the abrasive powder layer, a transition layer (not shown) may be provided. This transition layer may contain both carbide powder and diamond grit in a gradated mix to minimize stress concentration as taught in U.S. Pat. Re. No. 32,380. Alternatively, an intermediate mass may be included, for example, as taught in U.S. Pat. Nos. 4,403,015 and 4,440,573, which are incorporated herein by reference. Other variations will, of course, be obvious to those skilled in the art.

It is also contemplated that the invention can be practiced by employing a pre-sintered carbide disc for mass 34 to produce a unified mass as described below. Whether in the form of a powder or a pre-sintered disc, mass 34 preferably has a thickness of from about 0.060 inch to about 0.125 inch.

In the preparation of the tool inserts by the instant process, charge assembly 30 is placed in space 31 of apparatus 10, pressure is applied thereto and the system is heated. The temperatures employed are in the range of from about 1200° C. to about 2000° C. for periods of time in excess of about three minutes, while at the same time, the system is subjected to very high pressure, for example, on the order of 40 kilobars or more.

After completion of the high pressure, high temperature process, first the temperature and then the pressure is reduced. Upon recovery of the tool insert masses, the protective sheath metal remains strongly affixed to the outer surface thereof. Exposure of the desired surfaces of the composite tool inserts is accomplished by simply grinding away the protective sheath.

It should be appreciated that the shape of the tool inserts of the present invention need not be cylindrical, but can also be, for example, wedge-shaped, cubic, or the like. Moreover, the present invention is not limited to tools having an abrasive mass on only the upper and lower surfaces of the support mass. Thus, the present invention includes, for example, cubic compacts wherein four of the six surfaces have an abrasive mass bonded thereto.

In order to better enable those skilled in the art to practice the present invention, the following example is provided by way of illustration and not by way of limitation.

EXAMPLE

Fine cubic boron nitride powder having a mean size of 2.5 micron and fired in ammonia at 950° C. was blended with 4 weight percent nickel aluminide ($Ni_3Al$) powder having a mean size between 2 and 3 microns. Blending was performed using a one gallon attritor mill under dry conditions and using cemented tungsten carbide balls. The blended material was found to contain a very small amount of cemented carbide particles which were abraded from the mill balls. A quantity of the mixed material was loaded in a zirconium cup and leveled. Pressure was applied to obtain a uniform and dense mass of this material in the cup. A disc of cemented carbide was then inserted and pressed, followed by loading the same amount of cubic boron nitride powder on top of the carbide disc. Pressure was again applied in order to obtain a uniform and parallel layer of the cubic boron nitride. A zirconium disc of the same diameter as the cemented carbide was placed over the top layer of cubic boron nitride. The cup was then uniformly crimped. The loaded cups were then used to produce assemblies for high pressure, high temperature processing.

The charge assembly was placed in an apparatus similar to that shown in FIG. 1, and heated at a temperature of about 1400° C. and subjected to pressure of about 70 kilobars for a period of about 18 minutes. The temperature was then lowered and the removal of pressure begun when the temperature reached about 650° C. The result was a tool insert or compact having excellent properties.

Tool inserts manufactured in accordance with the foregoing procedure were tested in a three point bend fixture to determine rupture strength. As a comparison, cubic boron nitride compacts having only one abrasive surface (sold by General Electric Company under the trademark BZN) were tested. The BZN compact specimens were tested under two conditions: (a) the carbide substrate was down or away from the point of contact and (b) the carbide substrate was in contact with the loading pin and the cubic boron nitride layer was away from the point of contact. The results are set forth in Table 1.

TABLE 1

| Three Point Bend Deflection (Inch) | Maximum Stress (× 1000 psi) BZN Compact Carbide Up | Maximum Stress (× 1000 psi) BZN Compact Carbide Down | Maximum Stress (× 1000 psi) Present Invention |
| --- | --- | --- | --- |
| 0.01 | 4.2 | 8.4 | 10.6 |
| 0.02 | 6.8 | 10.1 | 17.7 |
| 0.03 | 13.5 | 13.5 | 24.5 |
| 0.04 | 14.8 | 16.9 | 29.6 |
| 0.05 | 21.1 | 25.3 | 40.6 |
| 0.06 | 29.6 | 33.8 | 51.5 |
| 0.07 | 42.2 | 49.0 | 60.0 |
| 0.075 | 46.5 | 51.5 | 64.9 |
| 0.08 | 54.9 | 59.1 | 75.2 |
| 0.09 | 63.4 | 76.0 | 90.8 |
| 0.10 | 76.0 | 88.7 | 102.2 |
| 0.11 | 88.7 | 101.4 | 120.8 |
| 0.12 | 101.4 | 118.3 | 169.0 |
| 0.13 | 114.0 | 135.2 | broke |

These results show that the compacts of the present invention are more rigid than single-sided prior art compacts.

Tool inserts manufactured in accordance with the foregoing procedure were tested for their machining performance on 4340 hardened steel relative to solid cubic boron nitride compacts and BZN compacts. In the first trial, the depth of cut was 0.02 inch and in the second trial the depth of cut was 0.05 inch. The results are set forth in TABLE 2.

TABLE 2

| Sample | Material Removed/Flank Wear (0.001 inch) |
| --- | --- |
| BZN (trial 1) | 1.1 |
| Solid CBN (trial 1) | 1.2 |
| Present Invention (trial 1) | 1.4 |
| BZN (trial 2) | 1.6 |
| Solid CBN (trial 2) | 1.7 |
| Present Invention (trial 2) | 1.9 |

These results show that the compacts of the present invention are more effective than prior art single-sided compacts or prior art solid compacts in removing metal from a test workpiece of 4340 hardened steel.

I claim:

1. An article comprising a support mass having abrasive masses bonded to at least each of the upper and lower surfaces of said support mass.

2. An article as set forth in claim 1 wherein said abrasive masses are selected from the group consisting of diamond and cubic boron nitride.

3. An article as set forth in claims 1 or 2 wherein said support mass is a carbide.

4. An article as set forth in claim 3 wherein said carbide is selected from the group consisting of tungsten carbide, titanium carbide, tantalum carbide, molybdenum carbide and mixtures thereof.

5. An article as set forth in claim 4 wherein said carbide is tungsten carbide containing a minor amount of cobalt.

6. An article as set forth in claim 2 wherein there is a transition layer between the support mass and at least one of the abrasive masses.

7. An article as set forth in claim 2 further comprising an intermediate mass disposed between said support mass and at least one of the abrasive masses.

8. An article as set forth in claims 6 or 7 wherein said support mass is a carbide.

9. An article as set forth in claim 3 wherein said support mass has a thickness of from about 0.060 inch to about 0.125 inch.

10. An article comprising a support mass selected from the group consisting of tungsten carbide, titanium carbide, tantalum carbide, molybdenum carbide and mixtures thereof, said support mass having abrasive masses selected from the group consisting of diamond and cubic boron nitride bonded to at least each of the upper and lower surfaces thereof.

11. An article as set forth in claim 10 wherein said abrasive masses are brazed to said support mass.

12. A process for making abrasive articles, comprising:
   (a) placing within an enclosure a quantity of abrasive particles and a quantity of support material in a manner such that the abrasive particles will become bonded to at least the upper and lower surfaces of said support material;
   (b) simultaneously heating and applying pressure to said enclosure in an amount effective to form a unified mass;
   (c) ceasing the input of heat to said enclosure;
   (d) ceasing the application of pressure to said enclosure; and (e) recovering the unified mass produced.

13. A process as set forth in claim 12 wherein the support material placed in said enclosure in step (a) is in powdered form.

14. A process as set forth in claim 12 wherein the support material placed in said enclosure in step (a) is a pre-sintered carbide.

15. A process as set forth in claim 12 wherein the temperature employed in step (b) is from about 1200° C. to about 2000° C.

16. A process as set forth in claim 12 wherein the pressure employed in step (b) is at least about 40 kilobars.

17. A process as set forth in claim 12 wherein the abrasive particles are selected from the group consisting of diamond and cubic boron nitride.

18. A process as set forth in claim 17 wherein the support material is selected from the group consisting of tungsten carbide, titanium carbide, tantalum carbide, molybdenum carbide and mixtures thereof.

19. A process as set forth in claim 12 further comprising placing an intermediate layer between the support material and at least one of the masses of abrasive particles.

20. A process for making abrasive articles, comprising:

(a) placing within an enclosure a quantity of abrasive particles selected from the group consisting of diamond and cubic boron nitride and a quantity of support material in a manner such that the abrasive particles will become bonded to at least the upper and lower surfaces of said support material;

(b) simultaneously heating said enclosure to a temperature of from about 1200° C. to about 2000° C. and applying pressure of at least about 40 kilobars to said enclosure so as to form a unified mass of support material and abrasive particles;

(c) ceasing the input of heat to said enclosure;

(d) ceasing the application of pressure to said enclosure when the temperature is below about 700° C.; and (e) recovering the unified mass produced.

21. A process for making abrasive articles, comprising brazing a unified mass of abrasive particles to at least the upper and lower surfaces of a support mass.

22. A process as set forth in claim 21, wherein said unified mass of abrasive particles is selected from the group consisting of diamond and cubic boron nitride and said support mass is a carbide.

23. A process as set forth in claim 21, wherein said unified mass of abrasive particles is selected from the group consisting of diamond and cubic boron nitride bonded to a carbide mass.

* * * * *